(12) United States Patent
Roberts et al.

(10) Patent No.: US 6,895,387 B1
(45) Date of Patent: May 17, 2005

(54) DYNAMIC MARKETING BASED ON CLIENT COMPUTER CONFIGURATIONS

(75) Inventors: M. Beauchamp Roberts, Foster City, CA (US); Siddaraya B. Revashetti, Santa Clara, CA (US); Chandrasekar Balasubramaniam, Sunnyvale, CA (US); Babu Katchapalayam, Santa Clara, CA (US); Ravi Lingarkar, Sunnyvale, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 794 days.

(21) Appl. No.: 09/596,890

(22) Filed: Jun. 19, 2000

Related U.S. Application Data

(63) Continuation-in-part of application No. 09/430,263, filed on Oct. 29, 1999, now Pat. No. 6,230,199.

(51) Int. Cl.$^7$ .............................................. G06F 17/60
(52) U.S. Cl. .......................... 705/14; 705/26; 707/204; 711/133
(58) Field of Search .................... 705/14, 26; 709/218; 707/204; 711/133; 717/172

(56) References Cited

U.S. PATENT DOCUMENTS

| | | | |
|---|---|---|---|
| 3,969,723 A | | 7/1976 | Kennicott |
| 4,558,413 A | | 12/1985 | Schmidt et al. |
| 4,714,992 A | | 12/1987 | Gladney et al. |
| 5,515,524 A | * | 5/1996 | Lynch et al. ................. 703/13 |
| 5,665,951 A | | 9/1997 | Newman et al. |
| 5,790,793 A | * | 8/1998 | Higley ........................ 709/218 |
| 5,826,102 A | | 10/1998 | Escobar et al. |
| 5,864,823 A | | 1/1999 | Levitan |
| 5,867,714 A | * | 2/1999 | Todd et al. ................. 717/172 |
| 5,870,549 A | | 2/1999 | Bobo, II |

(Continued)

FOREIGN PATENT DOCUMENTS

| | | |
|---|---|---|
| WO | 97/33421 | 9/1997 |
| WO | 00/45557 | 8/2000 |

OTHER PUBLICATIONS http://advertising.broadcast.com/ad_demos/index.html.
http://www.thinkmobile.com/article/00/00/37/.
http://www.dae.com/press.html.
http://www.grit.net.
http://www.o-a.com/archive/1997/November/0097.html.
http://www.ugeek.com/hwswrev/ppsubhed.htm.
http://www5conf.inria.fr/fich_html/papers/p52/overview.html.
http://www.w3.org/tr/speech-synthesis.
http://www.w3.org/tr/rdf-schema/.
http://www.w3.org/UI/voice/1998/workshop/minutes-13oct98.html.

*Primary Examiner*—John Leonard Young
(74) *Attorney, Agent, or Firm*—Zilka-Kotab, PC; Christopher J. Hamaty

(57) ABSTRACT

A system and method for dynamically marketing products and/or services to an end user of a device over a network based on a stored configuration profile of the client device are disclosed. The method generally comprises identifying at least one advertisement campaign according to a rules engine, applying the rules of the rules engine to the end user device profile, generating an advertisement campaign request containing a listing of at least one of the identified advertisement campaigns, transmitting the advertisement campaign request to an advertisement server over a network, receiving a dynamic advertisement application from the advertisement server, and executing the dynamic advertisement application for presenting the at least one advertisement campaign to the end user of the device.

1 Claim, 7 Drawing Sheets

U.S. PATENT DOCUMENTS

| | | |
|---|---|---|
| 5,913,040 A | 6/1999 | Rakavy et al. |
| 5,918,211 A | 6/1999 | Sloane |
| 5,948,061 A | 9/1999 | Merriman et al. |
| 5,948,104 A | 9/1999 | Gluck et al. |
| 6,009,409 A | 12/1999 | Adler et al. |
| 6,009,410 A | 12/1999 | LeMole et al. |
| 6,011,537 A | 1/2000 | Slotznick |
| 6,014,698 A | 1/2000 | Griffiths |
| 6,018,710 A | 1/2000 | Wynblatt et al. |
| 6,035,423 A | 3/2000 | Hodges et al. |
| 6,052,531 A | 4/2000 | Waldin, Jr. et al. |
| 6,073,214 A * | 6/2000 | Fawcett ..................... 711/133 |
| 6,101,485 A | 8/2000 | Fortenberry et al. |
| 6,101,486 A | 8/2000 | Roberts et al. |
| 6,119,165 A | 9/2000 | Li et al. |
| 6,151,643 A | 11/2000 | Cheng et al. |
| 6,167,407 A | 12/2000 | Nachenberg et al. |
| 6,230,199 B1 | 5/2001 | Revashetti et al. |
| 6,230,295 B1 * | 5/2001 | Watkins ..................... 714/742 |
| 6,285,985 B1 * | 9/2001 | Horstmann .................. 705/14 |
| 6,317,789 B1 | 11/2001 | Rakavy et al. |
| 6,513,052 B1 * | 1/2003 | Binder ...................... 707/204 |
| 2002/0069132 A1 * | 6/2002 | Perkes et al. ................. 705/26 |

* cited by examiner

DYNAMIC MARKETING BASED ON CLIENT COMPUTER CONFIGURATIONS

CROSS REFERENCE TO RELATED APPLICATIONS

This application is a continuation-in-part of U.S. patent application Ser. No. 09/430,263 entitled "Active Marketing Based on Client Computer Configurations" and filed on Oct. 29, 1999, now U.S. Pat. No. 6,230,199, issued May 8, 2001, the entirety of which is incorporated by reference herein.

BACKGROUND OF THE INVENTION

1. Field of the Invention

The present invention relates generally to computer systems and computer networks. More specifically, a system and method for dynamically marketing products and/or services to an end user of a device such as an end user computer over a network such as the Internet based on a configuration profile of the client device stored on the client device are disclosed.

2. Description of Related Art

Many companies utilize advertising in varying degrees to attract new customers, to retain existing customers, to increase sales, and/or to build customer and brand loyalty. With the proliferation of the Internet and the explosive growth of various forms of commerce that utilize the Internet in some way, it has become more and more important for companies to expand beyond the traditional advertising media that include television, radio, newspaper, magazine, mailing, and various other print media and to utilize the Internet for advertising.

Although broadcast print, television, radio, and online banner advertisements retain some effectiveness in retaining current customers and in gaining new customers through exposure to a large number of potential customers, the Internet by its nature offers many new and creative ways of cost-effectively targeting advertisement to more appropriate and receptive current and potential customers previously not readily available through the traditional advertising media.

Accordingly, the current marketing trend is toward the provision of targeted advertising information based upon the customers' behaviors and preferences. Online profiling coupled with advances in database technology and knowledge base techniques enables increasingly targeted communications with consumers based both upon the stated preferences of those consumers and their prior purchasing behavior.

Certain methods exist today for marketing products to consumers based upon the stated preferences of the consumer. For example, a software manufacturer may elect to collect preferences of consumers and potential consumers through a product survey. Such a survey can be conducted through mail, by phone interview, and/or through a website.

In the case of a survey posted on a website, the customer accesses and completes the survey available on the website. Typically, the customer receives some incentives for completing the survey. Results of the surveys may be collected, stored, aggregated, and analyzed for the purpose of determining the behavior of the consumers. Based on the survey information, the surveyor (or a partner of the surveyor) may choose to send a print advertisement, email communication, and/or other marketing communication to the consumers based upon the customers' responses to the survey. The marketing communication may be semi-customized by grouping of the survey responses into demographic subgroups or may be individually customized by utilizing a knowledge-based determination of the consumer's preferences from each consumer's responses to the survey.

As another example, a consumer may purchase a product or service for which the manufacturer or service provider includes a registration information packet. This registration information packet may be in the form of a registration card requesting the customer to provide such information as name, address, and phone number, and requesting the customer to answer a number of questions designed to provide insight into the consumer's purchasing behavior, profession, income, and so on. The manufacturer may additionally or alternatively include an electronic version of the registration packet or may provide access to the registration packet via the Internet by which the information can be collected. When the customer provides the registration information to the manufacturer, the manufacturer then has a record of the manufacturer's product purchased by the customer in addition to any of the supplementary information requested and/or supplied by the consumer. Based upon the knowledge of what product the consumer purchased, when the consumer purchased the item, and any combination of the supplementary information, the manufacturer can choose to target marketing communications to the particular consumer.

However, such mechanisms for collecting, storing, and analyzing consumer preferences often result in a time-consuming and imprecise process of generating notifications of new and related products. In addition, such mechanisms for collecting consumer-stated preferences and past purchasing behavior rely upon many factors such as the consumer responding at all to marketing surveys and/or registration information requests, the consumer accurately answering questions about previously purchased products and answering other system configuration-based questions, as well as the proper interpretation of the consumer's stated preferences or observed behavior into relevant marketing tactics. Delivery of hard-copy product notifications such as brochures often requires the grouping of consumers into subgroups in order to minimize the number of different targeted product advertisements that must be generated. If a preferred communication is email, the manufacturer and/or distributor must customize the email communication. It would thus be desirable for advertisement communications regarding any new or related product to be based on firm, timely knowledge of a consumer's preferences and behavior and be delivered in an effective, timely, and cost-efficient manner.

A method for scanning the user's computer for the presence of certain software programs for the purpose of providing updates to those software programs is disclosed in U.S. application Ser. No. 08/660,488, entitled "Automatic Updating of Diverse Software Products on Multiple Client Computer Systems" and filed on Jun. 7, 1996, the entirety of which is incorporated herein by reference. A similar method is currently in use at the McAfee Web site, the contents of which are incorporated by reference as of the filing date of the present patent application.

FIG. 1 illustrates a software update system 30 for updating software products on an end user computer system 40 similar to the method disclosed in U.S. patent application Ser. No. 08/660,488. The software update system 30 generally comprises one or more product and/or service vendor servers or computer systems 32 in communication with an update service provider server or computer system 36 containing an update information database 38 via a network such as the Internet 34. An end user computer 40 containing an update application 42 is also in communication with the service provider computer system 36 via the Internet 34.

The update information database 38 of the update service provider computer system 36 contains various information, such as update name, version, location, installation instructions and the like, about products for which updates are available. The update application 42 of the end user computer system 40 periodically communicates with the service provider computer system 36 via the Internet 34 to check products specified in the update information database 108 against the contents of the end user computer system 40. If a product specified in the product information database 38 is identified on the end user computer system 40, the end user computer system 40 is placed in communication with a corresponding vendor computer system 32 to optionally download or install the software update.

However, such a system for updating software products on: an end user computer system does not allow the dynamic marketing of software, hardware, and/or other related products and services to the user based on the current configurations of the end user's computer system and/or the preferences of the end user. Thus, it would be desirable to provide a system and method for dynamically marketing products or services based upon current configurations of the user's computer system.

SUMMARY OF THE INVENTION

A system and method for dynamically marketing products and/or services to an end user of a device such as an end user computer over a network such as the Internet based on a configuration profile of the client device stored on the client device are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are: described below.

Using the system and method described herein, a product and/or service vendor is able to dynamically target its advertisements to a more appropriate and receptive audience based on the current configuration profiles of the end user and/or the end user device while protecting private information regarding the user and/or the end user device against unauthorized access.

The method for dynamically marketing to an end user of an end user device containing an end user profile generally comprises identifying at least one advertisement campaign according to a rules engine containing rules, including applying the rules of the rules engine to the end user profile containing information regarding the end user device, generating an advertisement campaign request containing a listing of at least one of the identified advertisement campaigns, transmitting the advertisement campaign request to an advertisement server over a network, receiving a dynamic advertisement application from the advertisement server, and executing the dynamic advertisement application for presenting the at least one advertisement campaign to the end user of the end user device. The executing the dynamic advertisement application includes accessing information in the end user profile and utilizing the accessed end user profile information in presenting the at least one advertisement campaign to the end user of the end user device.

In a preferred embodiment, the end user profile is encrypted and the dynamic advertisement application includes an authentication key for decrypting the end user profile. The end user profile typically contains information relating to configurations of hardware and software of the end user device.

The dynamic advertisement application preferably includes at least one dynamic advertisement component having a plurality of display options, where the executing the dynamic advertisement application includes selecting from the plurality of display options based upon the end user profile information accessed by the dynamic advertisement application.

In one preferred embodiment, the method further includes, upon selection of the dynamic advertisement by the end user of the end user device, dynamically selecting a URL from a list of URLs stored in the dynamic advertisement application and transmitting the dynamically selected URL to a host server of the URL. In addition, the method may include receiving content from the host server of the dynamically selected URL. Preferably, the dynamic selecting is performed by the dynamic advertisement application and includes mapping the end user profile information accessed by the dynamic advertisement application to one of the URLs stored in the dynamic advertisement application.

According to another preferred embodiment, a system for dynamically marketing to an end user of an end user device containing an end user profile is disclosed. The system generally includes a rules engine comprising an advertisement campaign rules database containing rules for selecting advertisement campaigns based upon the end user profile, the end user profile containing information regarding the end user device, an advertisement campaign selection engine for applying the rules database against the end user profile to identify at least one advertisement campaign, and an advertisement campaign request generator for generating an advertisement campaign request containing a listing of at least one of the identified advertisement campaigns. The end user profile is accessible by a dynamic advertisement application executable on the end user device for presenting the at least one advertisement campaign to the end user based upon the end user profile.

According to yet another preferred embodiment, a computer product for dynamically marketing to an end user of an end user device is disclosed. The computer product generally comprises computer code that identifies at least one advertisement campaign according to a rules engine containing rules by applying the rules of the rules engine to the end user profile containing information regarding the end user device, computer code that generates an advertisement campaign request containing a listing of at least one of the identified advertisement campaigns, computer code that transmits the advertisement campaign request to an advertisement server over a network, computer code that receives a dynamic advertisement application from the advertisement server, and computer code for the dynamic advertisement application that executes to present the at least one advertisement campaign to the end user of the end user device, and a computer readable medium that stores the computer codes. The computer code for the dynamic advertisement application includes computer code that accesses information in the end user profile and utilizes the accessed end user profile information in presenting the at least one advertisement campaign to the end user of the end user device.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for dynamically marketing products and/or services to an end user of a device such as an end user computer over a network such as the Internet based on a configuration profile of the client device stored on the client device are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Overview and General Architecture of a System 100 for Dynamic Marketing

Figure 1:
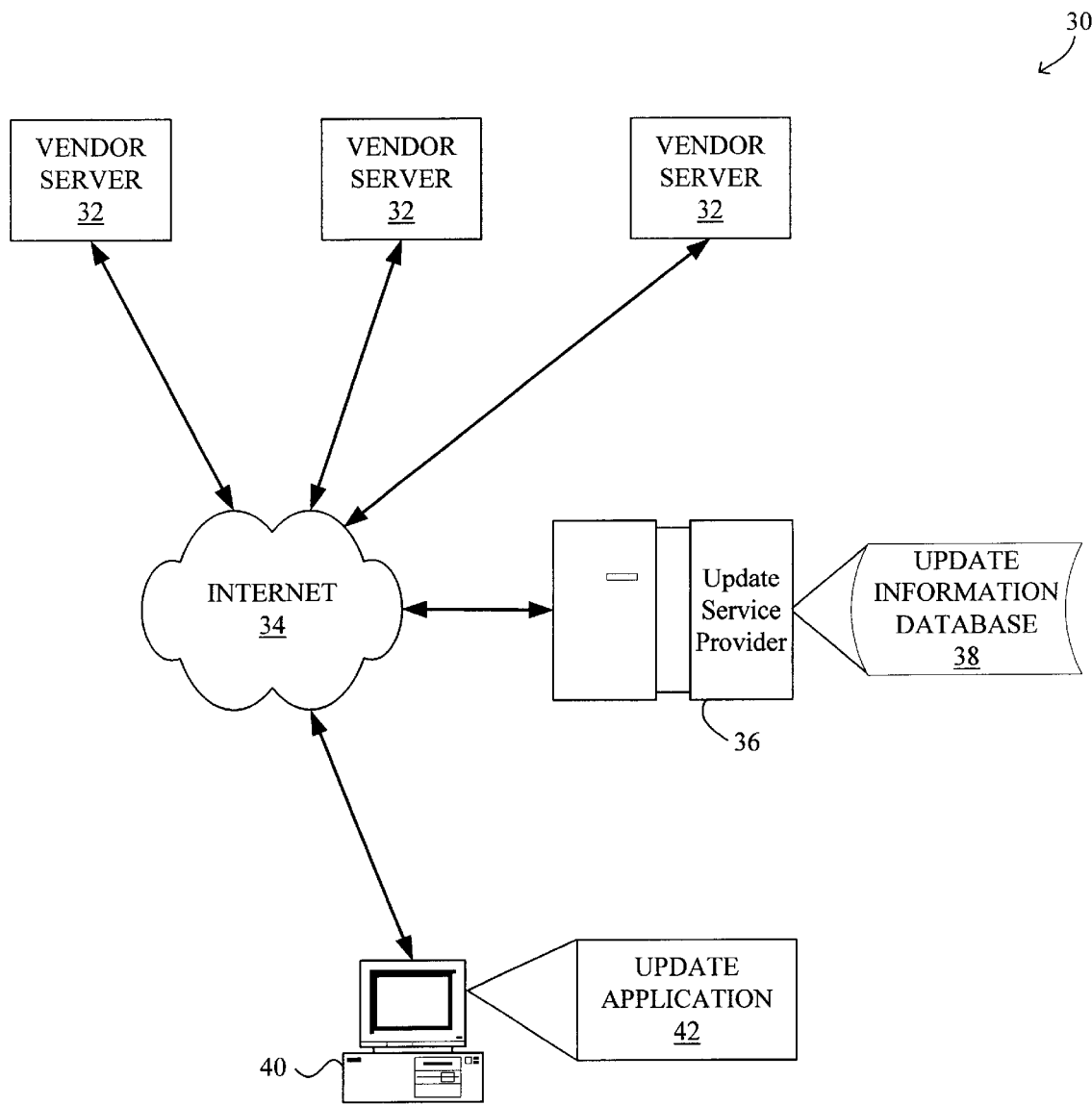
FIG. 1 is a block diagram of an example of a system for providing various software product updates to an end user computer.
Figure 2:
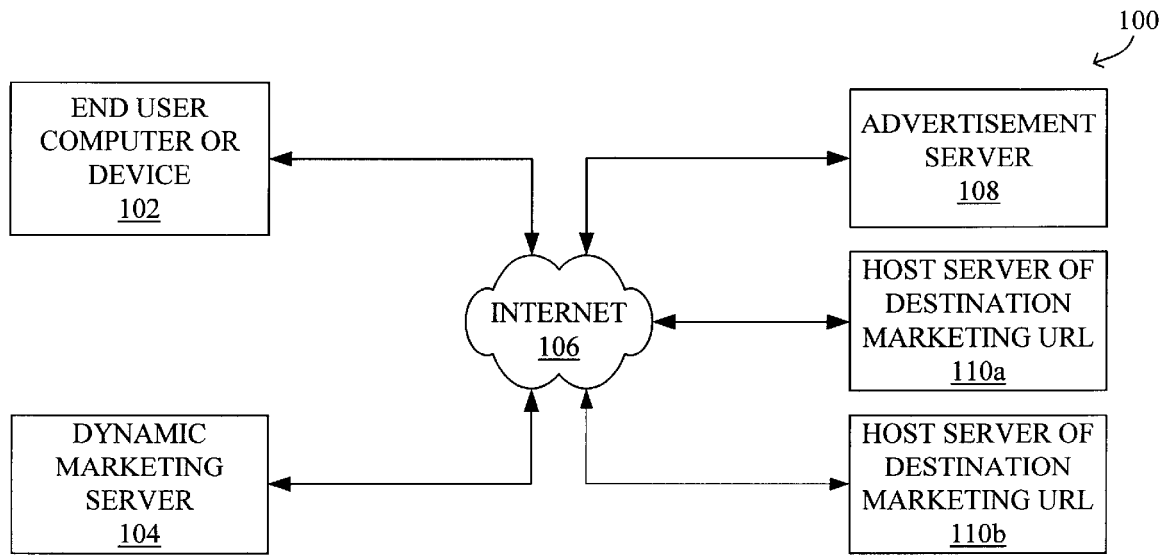
FIG. 2 is a block diagram illustrating the general architecture of a system for dynamic marketing according to one preferred embodiment.

FIG. 2 is a block diagram illustrating the general architecture of a system 100 for dynamic marketing according to one preferred embodiment. As shown, the dynamic marketing system 100 generally comprises an end user computer or device 102 that communicates with a dynamic marketing server 104 via a network such as the Internet 106. The dynamic marketing system 100 further comprises an advertisement server 108, host servers 110a, 110b of destination marketing URLs as determined by the end user computer 102. Each of the advertisement server 108 and host server 110 is preferably in communication with the end user computer 102 via Internet 106.

Figure 3:
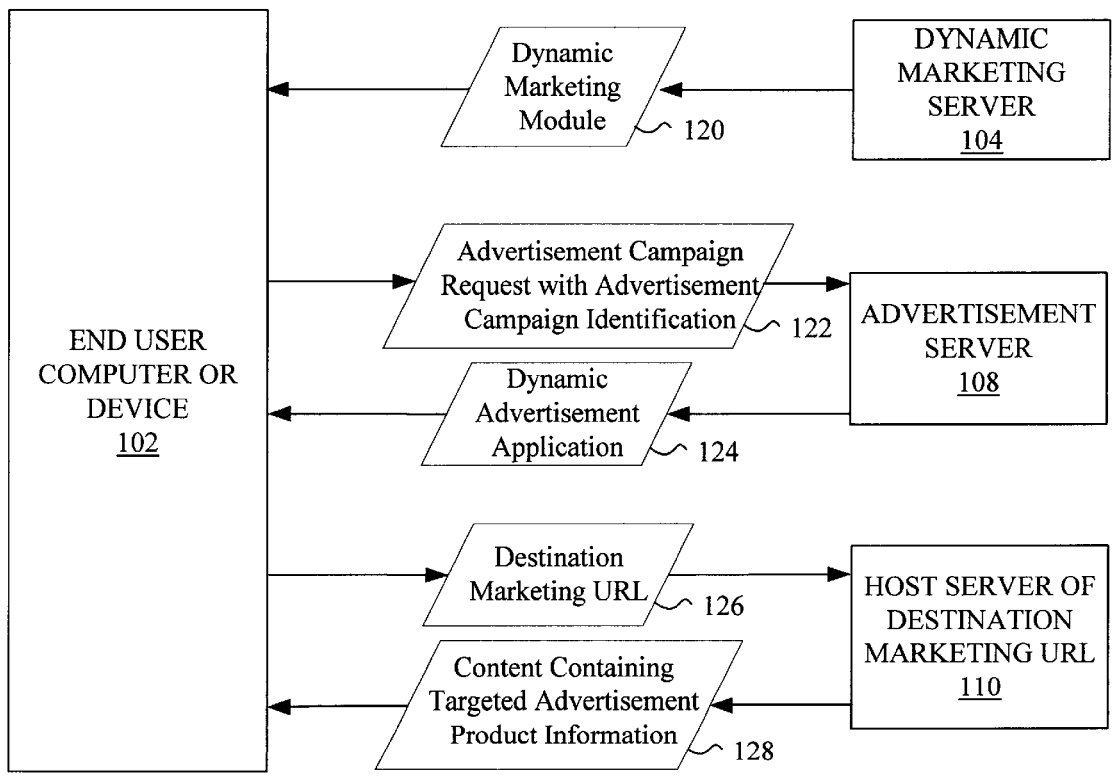
FIG. 3 is a schematic illustrating data communications between an end user computer or device on the one hand and a dynamic marketing server, an advertisement server, and a host server of an URL dynamically selected by the end user computer on the other hand according to one preferred embodiment.

FIG. 3 is a schematic illustrating data communications between the end user computer 102 on the one hand and the dynamic marketing server 104, the advertisement server 108, and the host server 110 of a destination marketing URL selected or determined by the end user computer 102 on the other hand according to one preferred embodiment.

As shown, the end user computer 102 may download or otherwise receive and store a dynamic marketing module 120 from the dynamic marketing server 104. The end user computer 102 may receive the dynamic marketing module 120 in response to a request from the end user computer 102, for example. The dynamic marketing module 120 may be stored in any suitable computer memory such as readable storage medium, system memory, and hard drive. Preferably, the dynamic marketing module 120 is an executable software application similar to the active marketing module described in co-pending U.S. application Ser. No. 09/430,263, now U.S. Pat. No. 6,230,199.

The dynamic marketing module 120 preferably resides in memory of the end user computer 102 and executes locally to detect and analyze files and/or other configurations of hardware and/or software present on the end user computer 102. Hardware may include any peripheral hardware devices for which software programs are detected even if the hardware devices themselves are not detected by the dynamic marketing module 120. For example, the dynamic marketing module 120 may detect software for a DVD drive but does not detect the DVD drive itself as the DVD drive may be disconnected from the computer or is otherwise currently not in use.

The dynamic marketing module 120 may scan the current configurations of the end user computer 102 and analyze the current configurations of the end user computer 102 in order to generate an end user computer profile. Preferably the end user computer profile is stored locally on the end user computer 102. The end user computer profile contains information regarding the software and hardware detected on the end user computer 102 and certain predetermined associated properties. For example, the end user computer profile may contain an entry for the hard drive and may include various detected and/or analyzed information regarding the hard drive such as the capacity of the hard drive, the organization or partitioning of the hard drive, the available and/or used space on the hard drive, the manufacturer and/or type of hard drive, etc. As another example, the end user computer profile may contain an entry for the microprocessor of the end user computer 102 and may include various detected and/or analyzed information regarding the microprocessor such as the speed and the manufacturer of the microprocessor.

The end user profile may be encrypted in order to prevent information from being pirated by unauthorized third parties attempting to gain access to information contained in the end user profile. Any applications or programs that desire access to the end user profile, such as the dynamic advertisement application as described below, would thus be required to contain an authentication key for decryption. It is to be understood that any other mechanism to protect the all or portions of the information contained in the end user profile may be implemented and utilized with the dynamic marketing system 100.

The dynamic marketing module 120 preferably resides on the end user computer 102 and executes locally to detect and analyze files and/or other configurations of hardware and/or software present on the end user computer 102. The dynamic marketing module 120 may be implemented as Active X controls, Java applets, Java scripts, Perl scripts or any other suitable client-side solutions or applications. In addition, although the dynamic marketing module 120 generates one end user profile in the preferred embodiment described herein, the dynamic marketing module 120 may alternatively generate multiple end user profiles such as a software end user profile, a hardware end user profile, and/or a networking end user profile. In addition, each end user profile is preferably stored at the end user computer 102.

It is to be understood that although the end user device 102 is typically a computer, the end user device 102 may alternatively be any device capable of storing and executing the dynamic marketing module 120 and for sending and receiving signals of the dynamic marketing process. For example, the end user device 102 may be a WebTV™ device and/or a DirecTV™ device, a personal digital assistant (PDA) such as a Palm Pilot™, a web-enabled cell phone, or any other suitable devices.

After the end user profile is generated, the end user computer 102 may then identify the desired advertisement campaign(s) and the corresponding advertisement campaign identifications using the dynamic marketing module 120 and the end user profile. The advertisement campaign identification is optionally a code that indicates to the advertisement server 108 the desired advertisement campaign. For example, an advertisement campaign may be an advertisement campaign for a hard drive or a disk drive for a particular vendor and/or manufacturer, an Internet service provider, a DSL service provider, an Internet cable service provider, etc. and optionally specify a particular vendor and/or manufacturer, for example.

The end user computer 102 may then generate an advertisement campaign request 122 that contains the advertisement campaign identification(s). The advertisement campaign request 122 may be implemented as dynamic HTML, CGI (Common Gateway Interface) program written in any suitable programming language such as C, Perl, Java, or Visual Basic, for example, server API (Application Program Interface), Java servlet, or any other suitable server-side applications or solutions.

The advertisement campaign request 122 may be encapsulated in one or more packets or cells, for example. The advertisement campaign request 122 generally does not include specific information from the end user profile. Preferably, each packet or cell of the advertisement campaign request 122 contains information about the desired advertisement campaign identifications as well as the source and destination of the packet or cell.

The advertisement campaign request 122 is transmitted to the advertisement server 108. It is to be understood that although the dynamic marketing server 104 and the advertisement server 108 are shown as separate elements, a single computer system or any suitable number of servers such as computer systems may serve as the marketing and advertisement servers 104, 108.

In response to receiving the advertisement campaign request 122 containing the identification(s) for the desired advertisement campaigns from the end user computer 102, the advertisement server 108 generates and transmits a dynamic advertisement application 124 to the end user computer 102. The dynamic advertisement application 124 is executed by the end user computer 102 and results in the display of dynamic advertisement(s) on a display of the end user computer 102. Although any other suitable form of display may be utilized, the dynamic advertisement application 124 is typically displayed as a banner advertisement. The dynamic advertisement application 124 may be implemented as Active X controls, Java applets, Java scripts, Perl scripts or any other suitable client-side applications or solutions.

The dynamic advertisement application 124 may contain a single advertisement component or multiple advertisement components. When the dynamic advertisement application 124 contains multiple advertisements, the multiple advertisements may be displayed together simultaneously or, more preferably, displayed individually by displaying each advertisement for a certain amount of time and cycling or rotating through each advertisement, for example. In addition, the dynamic advertisement application 124 may contain a pre-programmed or stored list of one or more destination marketing URLs. Each dynamic advertisement component corresponds to one of the stored destination marketing URLs. For example, if the dynamic advertisement application 124 contains multiple advertisements, each advertisement corresponds to a destination marketing URL stored or hard coded in the dynamic advertisement application 124. As is evident, any number of advertisements may correspond to a given destination marketing URL.

When the end user selects or responds to the dynamic advertisement such as by clicking on the dynamic advertisement, a destination marketing URL 126 corresponding to the selected dynamic advertisement is dynamically selected or determined by the end user computer 102. The destination marketing URL 126 typically includes a host name designating the destination host server 110 to which the end user computer connects. The destination marketing URL 126 thus serves as a request to the destination host server 110 for web content or a web page regarding the product and/or service advertised by the corresponding dynamic advertisement. As the dynamically selected destination marketing URL 126 does not contain data from the end user profile, information contain in the end user profile is thus protected from dissemination.

For example, if the end user responds to a dynamic advertisement for a CD-R/W drive for the end user computer, the dynamically selected URL would be a request for a webpage containing information for the CD-R/W drive. Thus, the end user is directed to a web page containing the matching or most suitable product given the current configuration of the end user computer without transferring any profile information to the host server of the dynamically selected URL.

Although not preferred, the dynamically selected URL may additionally include information obtained from the end user profile about the current CD-R/W drive, if any, of the end user computer. In this example, the dynamically selected URL 126 may include information about the read speed, the write speed, and the re-write speed about the current end user computer CD-R/W drive, whether the drive is an internal or external drive, the manufacturer, the model number, and/or any other information such as whether the end user computer is a desktop or a laptop computer and/or any other information that may affect compatibility of an advertised CD-RJW drive with the end user computer. The dynamically selected URL 126 may alternatively or additionally include information about the end user such as whether the end user is a telecommuter or a road warrior who travels frequently.

A secure connection may be established between the end user computer (the client) on the one hand and the host server and/or the advertisement server on the other hand. The secure connection may be established via secure sockets layer (SSL). SSL is known in the art and generally includes utilizing a private key to encrypt data that is transferred over the SSL connection. SSL is often utilized to obtain confidential user information, such as credit card numbers. Alternatively or additionally, a Secure HTTP (S-HTTP) may be utilized to transmit data securely via the Internet or the World Wide Web. S-HTTP is also known in the art and is generally designed to transmit individual messages securely. An SSL connection and/or S-HTTP facilitate in protecting the confidentiality of the dynamically selected URL that may contain end user profile data.

Upon receiving the dynamically selected destination marketing URL 126 from the end user computer, the host server 110 of the destination marketing URL transmits content containing the targeted advertisement product and/or service information. The content 128 may be displayed as a web page in a new browser window, a webpage in the original browser window from which the dynamic advertisement was selected, or content in all or a portion of the original browser window, and/or any other appropriate form of display.

The returned webpage may optionally access the end user profile and dynamically utilize the information to generate and display a webpage containing customized content. The webpage, similar to the dynamic advertisement application 124, may contain a client-side application that is executed by the end user computer 102. The dynamic webpage may be implemented as Active X controls, Java applets, Java scripts, Perl scripts or any other suitable client-side applications or solutions.

For example, the dynamic webpage may be a description of the product offered for sale, including static information such as the specification of the product and its price, as well as dynamically generated customized information such as a comparison of certain features between the device that the end user computer currently includes and the product being offered. Thus, because such a dynamically generated webpage, such as a product description webpage, contains information regarding not only the product being offered but also specific information about the end user and/or the end user computer obtained from the end user profile, the dynamically generated webpage can better assist the end user in assessing his own needs as well as the product being offered. As a result, the advertiser or vendor may be better able to assist the end user in reach a decision to purchase the product.

As an example, a vendor such as outpost.com may create a dynamic advertisement application for targeted selling of hard drives. The dynamic advertisement application automatically links a potential customer to a webpage that describes a hard drive determined to be the most appropriate hard drive for the potential customer's computer system when the potential customer clicks on the dynamic advertisement. In particular, the vendor may include in the dynamic advertisement application a set of URLs, each corresponding to one or more rules that specify certain attributes of the end user computer system. The URL in turn corresponds to a given hard drive that is the most appropriate hard drive given the set of attributes contained in the rules.

For instance, a URL would be selected upon satisfaction of certain rules such as presence of a SCSI bus, a Windows NT or Windows 2000 operating system, and more than 80% usage of the hard drive. When these condition are met and the end user clicks on the dynamic advertisement application, the dynamic advertisement application dynamically selects the appropriate URL from its internal stored list and links the end user to the appropriate website. This is similar to the rules engine of the dynamic marketing module that determines which advertisement(s) to serve. In the case of the dynamically selected URL, there is a set of rules built into the dynamic advertisement application that dynamically selects the URL when the advertisement is clicked.

Thus, the dynamic marketing module may contain one set of rules that determines the particular advertisement campaign(s) to request from the advertisement server. In addition, the dynamic advertisement application for the requested advertisement campaign may contain another set of rules that selects the destination marketing URL to which the end user is to be directed if the end user clicks on the dynamic advertisement. Typically, the rules of the dynamic marketing module are more numerous and may be more complex than the rules of the dynamic advertisement application.

Although the host servers 110 of certain dynamically selected URLs may be the same server as the dynamic marketing server 104 and/or the advertisement server 108, the host server 110 of the dynamically selected URL is typically that of the vendor or manufacturer of the product being offered and thus is typically separate and distinct from the dynamic marketing server 104 and/or the advertisement server 108.

An overview of the dynamic marketing system 100 having been presented above, details of the components of the dynamic marketing system 100 as well as the dynamic marketing process will now be described below with references to FIGS. 4–9.

Figure 4:
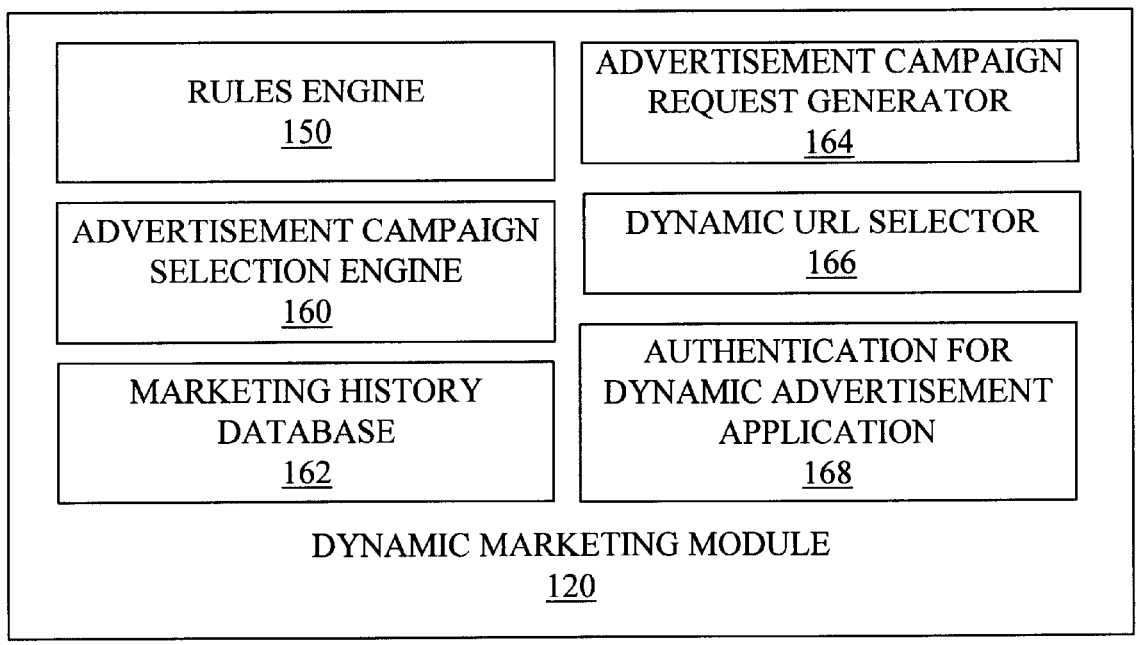
FIG. 4 is a block diagram illustrating components of the dynamic marketing module.

FIG. 4 is a block diagram illustrating in more detail the components of the dynamic marketing module 120. As shown, the dynamic marketing module 120 preferably comprises a rules engine 150, an advertisement campaign selection engine 160, and a marketing history database 162, any or all of which may be stored locally at the end user computer and/or periodically updated via the Internet 106. In addition, the dynamic marketing module 120 preferably further comprises an advertisement campaign request generator 164 for generating the advertisement campaign request, a dynamic URL selector 166 for dynamically selected the URL from the list of stored URLs, and an authentication for dynamic advertisement application 168.

The rules engine 150 applies advertisement campaign selection rules to the end user profile to identify one or more desired advertisement campaigns. The rules engine 150 may include a fall back or default rule such that a generic or default advertisement campaign is identified when no other advertisement campaign selection rule is satisfied.

The advertisement campaign selection engine 160 functions to select one or more of the advertisement campaign identifications for inclusion in the advertisement campaign request that is to be transmitted to the advertisement server. For example, the rules engine 150 may identify a number of desired advertisement campaigns greater than the maximum number that may be included in the advertisement campaign request. Thus, the dynamic marketing module 120 must select up to the maximum number of advertisement campaigns that may be included in the advertisement campaign request from the advertisement campaigns identified by the rules engine.

The advertisement campaign selection engine 160 may select any suitable number of the identified advertisement campaign identifications in any suitable manner, such as randomly, based upon a priority value, and/or based upon a marketing history database 162 maintained by the dynamic marketing module, for example. The marketing history database 162 may store a history of the advertisement campaigns displayed, a history of the advertisement campaigns for which the end user requested additional information and optionally the length of time that the end user displayed such additional information, and/or a history of the advertisement campaigns for which the end user made a purchase, for example.

Figure 5:
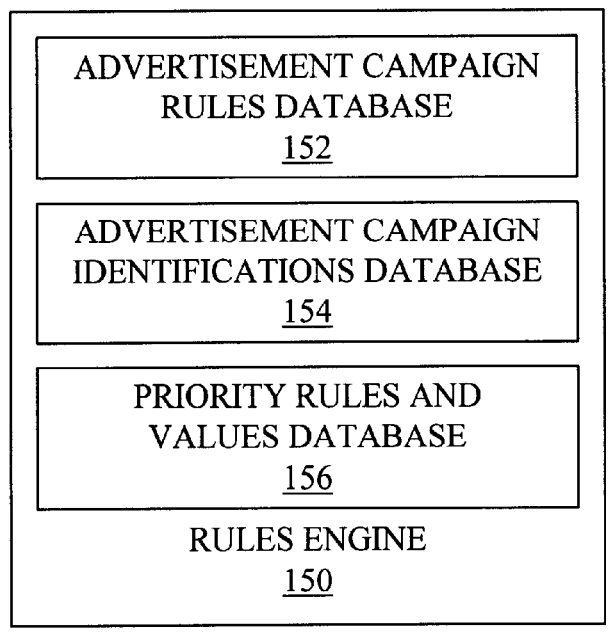
FIG. 5 is a block diagram illustrating in more detail a rules engine of the dynamic marketing module.

FIG. 5 is a block diagram illustrating in greater detail the rules engine 150 of the dynamic marketing module 120. In particular, the rules engine 150 may include an advertisement campaign rules database 152, an advertisement campaign identifications database 154, and a priority rules and values database 156, any or all of which may be stored locally at the end user computer and/or periodically updated via the Internet 106. Application of the rules in the rules database 152 to the end user profile generally results in the selection of one or more advertisement campaigns having associated advertisement campaign identifications. In other words, if the end user profile satisfies a given rule upon application of the rules database 152 by the dynamic marketing module 120, the dynamic marketing module 120 selects the advertisement campaign corresponding to given rule as a desired advertisement campaign.

The rules engine 150 may also contain the priority rules and values database 156 such that a priority value is generated and assigned to each desired advertisement campaign identification. In particular, the priority value for each desired advertisement campaign identification may be determined by application of the priority rules of the priority rules and values database 156. The priority value may optionally be determined based upon the extent or degree to which the criteria of the given rule are satisfied and/or exceeded. For example, a given rule may specify that a hard disk upgrade advertisement campaign be selected if the hard drive is at least 75% full. The priority value given to the hard disk upgrade advertisement campaign may be a function of the percentage utilization of the hard disk and/or the capacity of the hard drive. Additionally or alternatively, the priority rules and values database 156 may include a priority value for each advertisement campaign in the dynamic marketing module 120 without regard to the information in the user profile.

Figure 6:
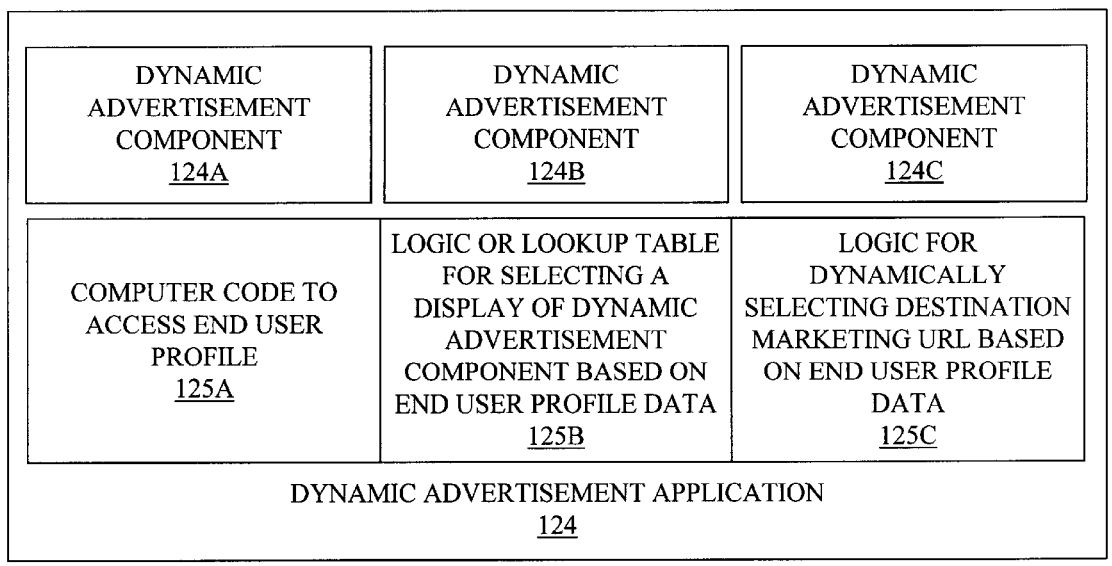
FIG. 6 is a block diagram illustrating the dynamic advertisement application generated and transmitted by an advertisement server to the end user computer.

FIG. 6 is a block diagram illustrating the dynamic advertisement application 124 generated and transmitted by the advertisement server to the end user computer. The dynamic advertisement application 124 may comprise any suitable number of dynamic advertisement components. The dynamic advertisement application 124 may additionally comprise computer code for accessing end user profile 125A, logic or lookup table for selecting a display of dynamic advertisement component based on end user profile data 125B, and/or logic with optional encoder for mapping appropriate end user profile data to a dynamically selected URL 125C. Although not preferred, an optional encoder (not shown) may be included for encoding end user profile data in the dynamically selected URL.

In the example shown in FIG. 6, the dynamic advertisement application 124 includes three dynamic advertisement components 124A, 124B, 124C. Each dynamic advertisement component preferably corresponds to an advertisement campaign that is to be displayed on the display of the end user computer. For example, the dynamic advertisement components 124A, 124B, 124C may be advertisement campaigns for a hard drive, for a microprocessor, and for a CD-R/W drive, respectively. The dynamic advertisements corresponding to the dynamic advertisement components may be simultaneously displayed and/or rotated such that each is displayed for a given amount of time.

Each dynamic advertisement application component may be an application implemented by any suitable client-side application or solution, as noted above. The dynamic advertisement application component may include logic to access the end user profile. In other words, the dynamic marketing module 120 exposes the end user profile to the dynamic advertisement application 124 and enables the dynamic advertisement display to be based upon the data contained in the end user profile.

The corresponding advertisement display may be dependent upon certain data contained in the end user profile. More specifically, the logic or lookup table 125B of the dynamic advertisement application 124 selects a display of a dynamic advertisement component based on end user profile data. For example, the dynamic advertisement component 124A for a hard drive may comprise any number of differing advertisement displays for a hard drive and the particular advertisement display may be selected by the dynamic advertisement component 124A depending upon the information contained in the end user profile.

In one example, the dynamic advertisement component 124A may display one of three advertisements depending upon the percent usage of the current hard drive. For example, the dynamic advertisement component 124A may display a yellow background, a red background, or a flashing red background if the current hard drive of the end user computer is 70% to 80% full, 80% to 90% full, or more than 90% full. In addition or alternatively, the text displayed in the dynamic advertisement for the hard drive may also be different each case such as "You are using X % of your hard drive. Double your hard drive capacity for only $299. Click here to learn more at outpost.com," if the current hard drive of the end user computer is 70% to 80% full;

"Your hard drive is X % full. You should upgrade your hard drive now. Click here to learn about and/or buy a larger hard drive from outpost.com," if the current hard drive of the end user computer is 80% to 90% full; or "Your hard drive is X % full! You must upgrade your hard drive soon! Click here to learn about and/or buy a larger hard drive from outpost.com," if the current hard drive of the end user computer is more than 90% full.

As noted above, when the end user responds to the dynamic advertisement such as by clicking on the dynamic advertisement, a URL is dynamically selected by the end user computer. In particular, the logic or look up table 125C of the dynamic advertisement application 124 maps the appropriate end user profile data to dynamically select a destination marketing URL.

As noted above, although not preferred, an encoder may encode certain appropriate end user profile data in a suitable format for inclusion in dynamically selected URL. In particular, the encoder may encode the end user profile data such that the data is not readily understandable or interpretable by unauthorized third parties, such as parties that intercept the transmission of the dynamically selected URL. The destination host server preferably includes a corresponding decoder so as to be able to decode and thus interpret the encoded URL.

Figure 7:
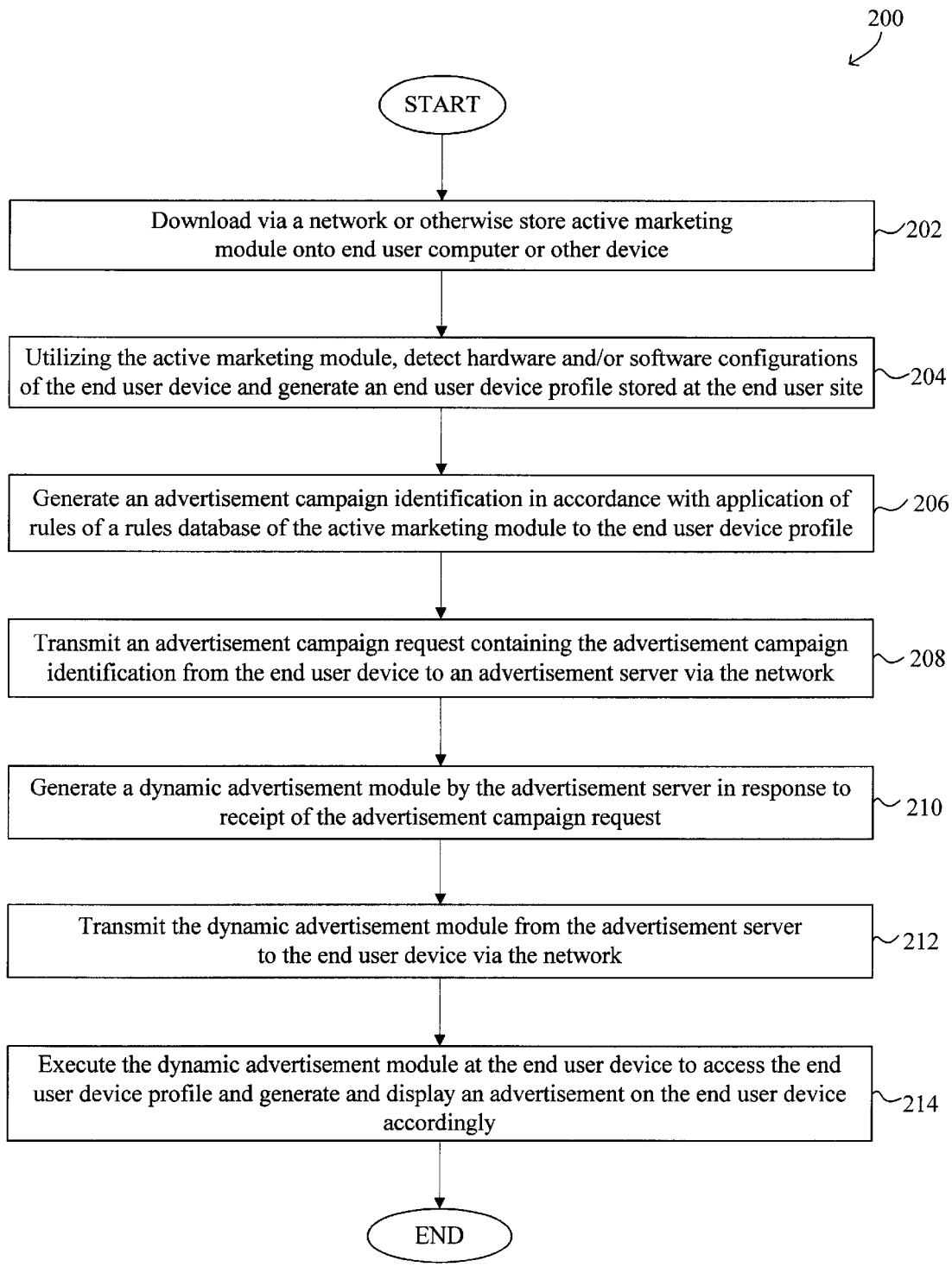
FIG. 7 a flowchart illustrating a process for generating and utilizing an end user configuration profile and for generating a dynamic advertisement on the end user device according to one preferred embodiment.

Details of the dynamic marketing process will now be described below with references to FIGS. 7–8. FIG. 7 is a flowchart illustrating a process 200 for generating and utilizing an end user configuration profile and for generating a dynamic advertisement on the end user computer or device according to one preferred embodiment.

At step 202, an active marketing module is downloaded via a network or otherwise stored onto an end user computer or other device. At step 204, the active marketing module detects the hardware and/or software configurations of the end user device, generates an end user device profile, and stores the end user device profile at the end user site, preferably at the end user device.

At step 206, the active marketing module generates one or more advertisement campaign identifications in accordance with application of rules of a rules database of the active marketing module to the end user device profile. At step 208, the active marketing module transmits an advertisement campaign request containing the one or more advertisement campaign identifications from the end user device to an advertisement server via the network.

At step 210, the advertisement server generates a dynamic advertisement module in response to receipt of the advertisement campaign request. At step 212, the advertisement server transmits the dynamic advertisement module from the advertisement server to the end user device via the network.

At step 214, the end user device, preferably utilizing the active marketing module, executes the dynamic advertisement module to access the end user device profile and generates and displays one or more dynamic advertisement on the end user device accordingly.

Figure 8:
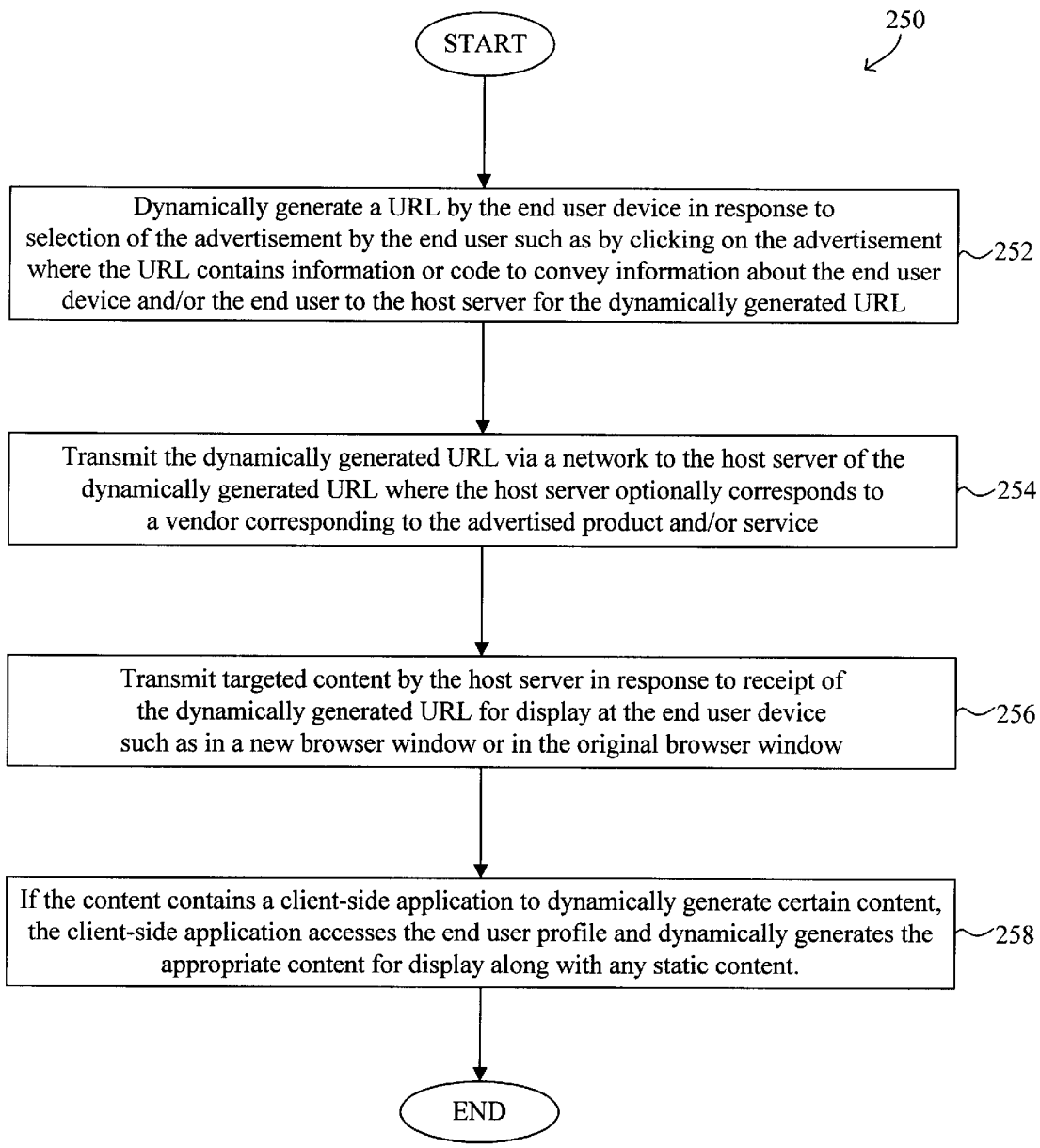
FIG. 8 is flowchart illustrating a process for dynamically selecting a URL corresponding to the dynamically generated advertisement and for displaying the targeted webpage for the product or service corresponding to the dynamically selected URL on the end user computer according to one preferred embodiment.

FIG. 8 is flowchart illustrating a process 250 for dynamically selecting a URL by the active marketing module corresponding to the dynamically generated advertisement and for displaying the targeted webpage for the product or service corresponding to the dynamically selected URL on the end user computer according to one preferred embodiment.

At step 252, the end user device dynamically selects a URL in response to selection of the dynamic advertisement by the end user, such as by clicking on the advertisement. The dynamically selected URL preferably is selected from a list of URLs contained in the dynamic advertisement application. Although not preferred, the dynamically selected URL may also contain information or encoded data to convey information about the end user device and/or the end user to the host server for the dynamically selected URL.

At step 254, the end user computer transmits the dynamically selected URL via a network to the host server of the dynamically selected URL. The host server optionally corresponds to a vendor or manufacturer of the product and/or service advertised in the dynamic advertisement. At step 256, the host server transmits a targeted content, such as a webpage, in response to receipt of the dynamically selected URL. The content is displayed at the end user device, such as in a new browser window or in the original browser window.

Lastly, at step 258, if the webpage contains a client-side application to dynamically generate certain content, the client-side application accesses the end user profile and dynamically generates the appropriate content for display along with static content.

Figure 9:
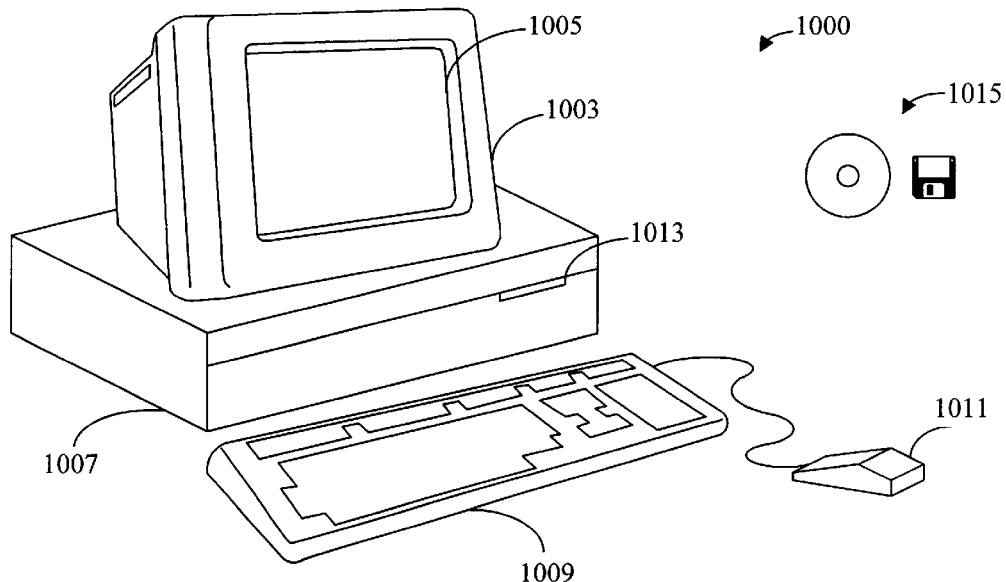
FIG. 9 illustrates an example of a computer system that can be utilized with the various embodiments of method and processing described herein.
Figure 10:
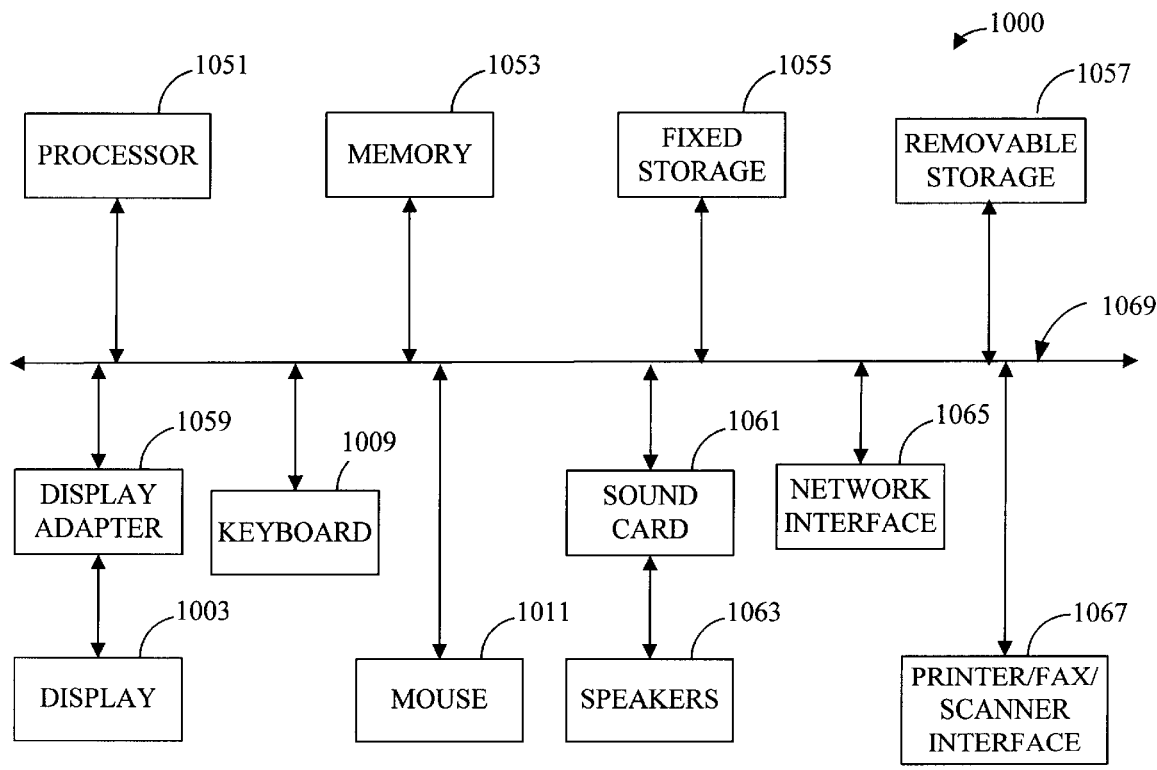
FIG. 10 illustrates a system block diagram of the computer system of FIG. 9.

FIGS. 9 and 10 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 10155, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 101, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

The computer system 1000 may be illustrative of the computer system of the end user computer or device, the advertisement server, and/or the host server of a dynamically selected URL.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for dynamically marketing to an end user of an end user device containing an end user profile, comprising:

identifying at least one advertisement campaign according to a rules engine containing rules, said identifying includes applying the rules of the rules engine to the end user profile containing information regarding the end user device, wherein the end user profile contains information relating to configurations of hardware and software of the end user device including organization and partitioning of a hard drive, available space on the hard drive, a manufacturer of a processor, a speed of the processor, a manufacturer of a CD-R/W drive, a model number of the CD-R/W drive, and a location of the CD-R/W drive; in addition to a percentage of utilization of an available capacity of the hard drive, and a scenario where DVD drive software is present in the absence of a DVD drive, wherein the end user profile includes a separate software end user profile, hardware end user profile and networking end user profile;

generating an advertisement campaign request containing a listing of at least one of the identified advertisement campaigns;

transmitting the advertisement campaign request to an advertisement server over a network;

receiving a dynamic advertisement application from the advertisement server including a plurality of uniform resource locators (URLs); and executing the dynamic advertisement application for presenting the at least one advertisement campaign to the end user of the end user device, wherein said executing the dynamic advertisement application includes accessing information in the end user profile and utilizing said accessed end user profile information in automatically and dynamically selecting at least one of the URLs and presenting the at least one advertisement campaign included in the dynamic advertisement application to the end user of the end user device based on the accessed end user profile including the percentage of utilization of the available capacity of the hard drive;

wherein the advertisement campaign includes a color that is selected based on the accessed end user profile including the percentage of utilization of the available capacity of the hard drive;

wherein the dynamic advertisement application compares: the hardware and software of the end user device, and hardware and software of offered products associated with the advertisement campaign to generate a comparison of features via a webpage containing information regarding the offered products, the end user, the end user device, the webpage connected via a plurality of URLs each corresponding to one or more rules including the percentage of utilization of the available capacity of the hard drive;

wherein the advertisement campaign is selected from a plurality of advertisement campaigns based on a priority value that is assigned as a function of the user profile, which contains the information relating to the configurations of hardware and software of the end user device including the percentage of utilization of the available capacity of the hard drive;

wherein the dynamic selecting of the URL is performed by the dynamic advertisement application and includes mapping the end user profile information accessed by the dynamic advertisement application to the dynamically selected URL;

wherein the end user profile is encrypted and wherein the dynamic advertisement application includes an authentication key for decrypting the end user profile;

wherein said generating the advertisement campaign request containing the listing of at least one of the identified advertisement campaigns includes selecting at least one advertisement campaign for inclusion in the advertisement campaign request from the identified advertisement campaigns according to an advertisement campaign selection engine;

wherein the dynamic advertisement application includes at least one dynamic advertisement component having a plurality of display options, said executing the dynamic advertisement application includes selecting from the plurality of display options based upon the end user profile information accessed by the dynamic advertisement application.

\* \* \* \* \*

UNITED STATES PATENT AND TRADEMARK OFFICE
CERTIFICATE OF CORRECTION

PATENT NO. : 6,895,387 B1
APPLICATION NO. : 09/596890
DATED : May 17, 2005
INVENTOR(S) : Roberts et al.

Page 1 of 1

It is certified that error appears in the above-identified patent and that said Letters Patent is hereby corrected as shown below:

Col. 16, line 16, delete ":" after "compares";

Signed and Sealed this

Ninth Day of February, 2010

David J. Kappos
*Director of the United States Patent and Trademark Office*